Aug. 12, 1947.       L. E. NORTON       2,425,386
DIRECTION FINDER
Filed May 29, 1943       2 Sheets-Sheet 1
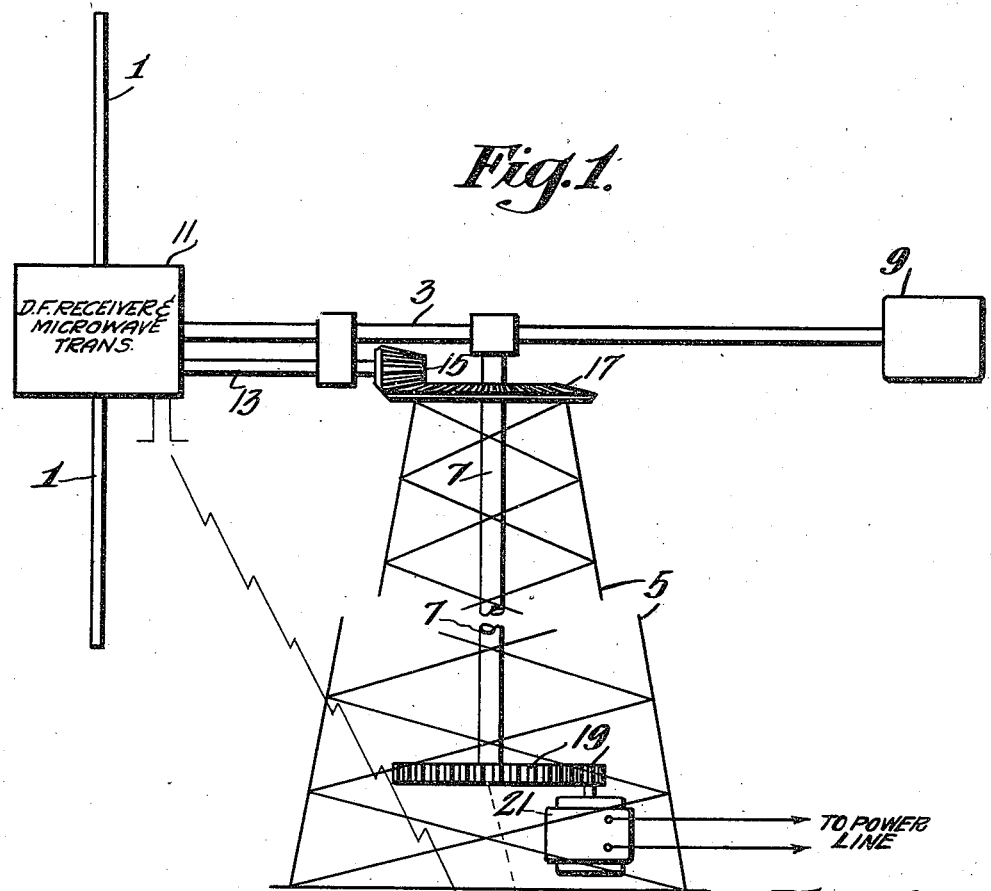
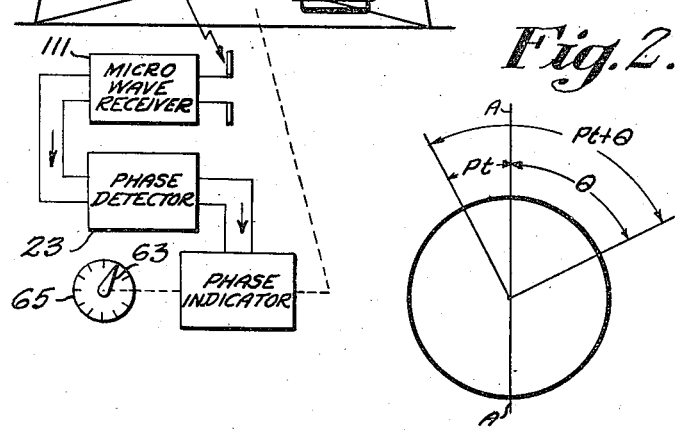
Inventor
Lowell E. Norton
By
CD Tuska
Attorney

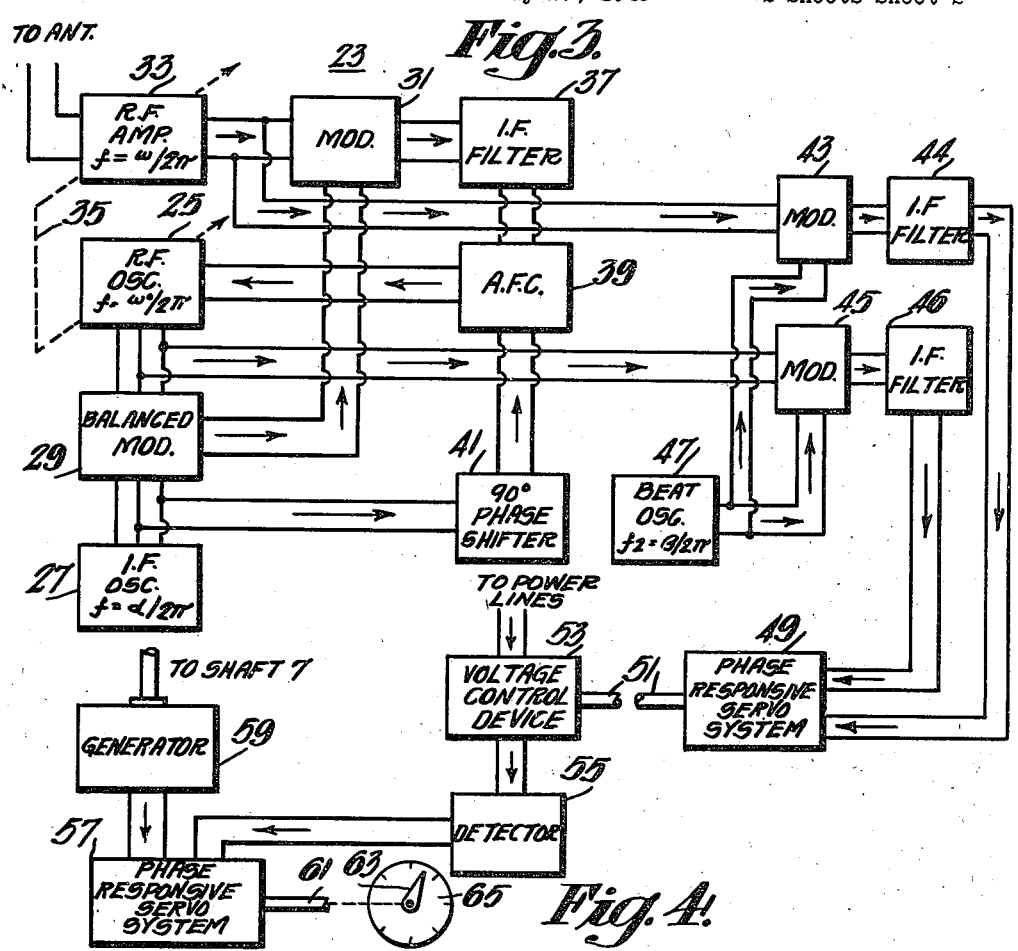

Patented Aug. 12, 1947

2,425,386

UNITED STATES PATENT OFFICE 2,425,386

DIRECTION FINDER

Lowell E. Norton, Princeton, N. J., assignor to Radio Corporation of America, a corporation of Delaware Application May 29, 1943, Serial No. 489,034

5 Claims. (Cl. 250—11)

This invention relates to radio direction finders, and more particularly to improvements in the art of determining the azimuth of arrival of a radio wave by means of a continuously revolving collector system, as described in detail in copending U. S. application Ser. No. 487,678, filed on May 20, 1943, by L. E. Norton, entitled "Direction finders." Revolution of the collector system produces phase modulation of the carrier of a received signal. The absolute phase of this modulation is a function of the azimuth of wave arrival. One method of determining azimuth in response to the modulation introduced by antenna revolution is described in the above mentioned application.

The principal object of the present invention is to provide an improved method of and means for indicating azimuth of wave arrival in response to phase modulation produced at the receiving antenna.

Another object is to provide an improved method of and means for indicating the elevation of wave arrival in response to phase modulation produced at the receiving antenna.

A further object is to provide a fully automatic direction indicating system of the described type.

These and other objects will become apparent to those skilled in the art upon consideration of the following description with reference to the accompanying drawing, of which:

Fig. 1 is a elevational view of the structure of a direction finder according to the present invention, Fig. 2 is a graph representing the angular relationships involved in the operation of the system, Fig. 3 is a schematic block diagram of an indicator system according to the invention, and Fig. 4 is a schematic circuit diagram of a phase responsive servo system.

Referring to Fig. 1, a wave collector comprising a vertical dipole antenna 1 is supported at one end of a horizontal boom 3. Any desired type of collector element may be substituted for the dipole 1, although a non directive element such as a vertical dipole or a horizontal loop is to be preferred. The boom 3 is rotatably supported at the upper end of a tower 5 and connected to a shaft 7 extending within the tower. The necessary radio receiver equipment is supported in a housing 11 which is adjacent the antenna 1. Power for the operation of the equipment may be provided by batteries or by means of a generator contained within the housing 11 and coupled to a shaft 13 extending along the boom 3. A counterweight 9 is provided at the other end of the boom 3. The shaft 13 is connected through a pinion 15 to a gear 17 provided at the top of the tower 5. The lower end of the shaft 7 is coupled through gearing 19 to a motor 21. The described structure is similar to that described in copending application Ser. No. 488,018, filed on May 22, 1943, by L. E. Norton. The motor 21 drives the shaft 7 at constant speed, moving the boom and hence the antenna 1 in a circular path. This movement produces phase modulation of signals picked up by the antenna, owing to the cyclical variation in the distance between the antenna and the radiation source.

Referring to Fig. 3, a phase detector system, generally designated by the reference numeral 23, of the type described in the aforementioned copending application, is connected to the antenna 1. The phase detector 23 comprises a local radio frequency oscillator 25, a fixed intermediate frequency oscillator 27, a balanced modulator 29 connected to the oscillators 25, and 27 and a modulator 31 connected to the output circuit of the modulator 29. A radio frequency amplifier 33 is provided in the input circuit from the antenna 1 and is coupled to the modulator 31. The tuning controls of the oscillator 25 and the amplifier 33 are mechanically ganged, as indicated by the dash line 35. The output circuit of the modulator 31 is coupled to a filter 37 which is tuned to pass voltages of intermediate frequency.

The oscillator 25 is arranged to be controlled over a narrow range of frequency by means of a D.-C. control voltage. An automatic frequency control circuit 39 for this purpose is coupled to the the filter 37 and hence to the oscillator 25. The A.-F.-C. circuit 39 is also connected through a 90° phase shifter 41 to the output circuit of the I.-F. oscillator 27.

A modulator 43 is connected to the output of the amplifier 33. A modulator 45 is connected to the output of the oscillator 25. A common beat oscillator 47 is connected to the modulators 43 and 45. Filters 44 and 46, tuned to pass the intermediate frequency are connected to the output circuits of the modulators 43 and 45, and to a phase responsive servo system 49.

The servo system 49 is provided with an output shaft 51 and is arranged to cause rotation of said shaft to an angular position corresponding to the difference in phase between the two inputs from the modulators 43 and 45. The shaft 51 is mechanically coupled to a voltage control device 53 which may be a variable mutual inductance regulator of the "variac" type or any other mechanically controllable regulator known to those skilled in the art. A constant voltage input is supplied to the control device 53 from a source not shown, such as A.-C. power lines.

The output of the control device 53 is applied to a detector 55, comprising a diode rectifier or the like and a filter arranged to reject components of the power supply frequency. The output of the detector 55 is applied to a phase responsive servo system 57 which is identical in construction with the servo system 49. An alternator 59 is coupled to the antenna shaft 7 by connection to the shaft 13, for example (Fig. 1), to provide one cycle for each revolution of the wave collector. The output of the generator 59 is applied to the servo system 57. The output shaft 61 of the servo system 57 is coupled to an indicator 63. A scale 65, calibrated in terms of azimuth, is provided for cooperation with the pointer 63.

The operation of the above described system is as follows:

The amplifier 33 and the oscillator 25 are tuned to the frequency of the desired signal. The outputs of the oscillator 25 and the oscillator 27 are combined in the balanced modulator 29 to provide a voltage differing in frequency from the carrier by substantially I.-F. frequency. The output of the modulator 29 is combined in the modulator 31 with the output of the amplifier 33 to provide a signal of I.-F. frequency carrying the phase modulation of the incoming carrier. The filter 37 removes all components of carrier and higher frequencies from the output of the modulator 31.

Initially, the output of the oscillator 25 may not be of exactly the same frequency as the incoming carrier. In this event the output of the balanced modulator will not differ from the carrier frequency by exactly the frequency of the oscillator 27, and the output of the filter 37 will be of a frequency correspondingly differing from the I.-F. frequency. These two frequencies are compared in the A.-F.-C. circuit 39 to produce a D.-C. voltage corresponding in magnitude and polarity to their difference. The D.-C. output of the A.-F.-C. circuit 39 is applied to the control circuit of the oscillator 25, adjusting the frequency of the locally generated R.-F. voltage so that the two I.-F. voltages are equal in frequency. At this time, the frequency of operation of the oscillator 25 will be exactly equal to the carrier frequency.

The phase detector 23 provides two outputs: phase modulated R.-F. carrier voltage which is applied to the modulator 43, and unmodulated R.-F. voltage of carrier frequency which is applied to the modulator 45. The output of the amplifier 33 may be represented as:

$$e_0 = E_0 \sin [\omega t - 2\pi r/\lambda \cos \psi \cos (\rho t + \theta)]$$

where $r$ is the radius of the path swept by antenna, $\psi$ is the elevation of wave arrival, $\rho/2\pi$ is the frequency of revolution of the antenna, and $\theta$ is the azimuth of wave arrival. Referring to Fig. 2, the angular position $\rho t$ of the antenna and the azimuth angle $\theta$ are measured from a predetermined reference line A—A, such as the local meridian. The output of the oscillator 25 may be represented as:

$$e_1 = E_1 \cos \omega t$$

The output of the beat oscillator 47 is:

$$e_2 = E_2 \cos \beta t$$

The voltages $e_0 E_2$ are applied to the modulator 43 and the voltages $e_1$ and $e_2$ are applied to the modulator 45. The output of the modulator 43 includes, among other components, a voltage:

$$e_3 = E_3 \sin [(\beta - \omega) t + 2\pi r/\lambda \cos \psi \cos (\rho t + \theta)]$$

All components other than $e_3$ are removed by the filter 44. The voltages $e_1$ and $e_2$ are applied to the modulator 45. The output from the filter 46 is:

$$e'_3 = E'_3 \cos (\beta - \omega) t$$

The voltages $e_3$ and $e'_3$ are applied to the servo system 49, causing the shaft 51 to be displaced to variable angular position $$\gamma = 2\pi 4/\lambda \cos \psi \cos (\rho t + \theta)$$

The shaft of the voltage control device 53 is displaced correspondingly. The output of the voltage control device 53 is:

$$e_4 = E_4 [1 + m \cos \psi \, 2\pi r/\lambda \cos (\rho t + \theta)] \cos n\rho t$$

where $n\rho t/2\pi$ is the frequency of the input potential from the power line to the control device 53. The regulator 53 is so connected to the shaft 51 that $$m \cos \psi \, 2\pi r/\lambda \cos (\rho t + \theta)_{max} = e_{4 \, max}$$

The voltage $e_4$ is applied to the detector 55, providing an output including a voltage $$e_5 = E_5 \, m \cos \psi \, 2\pi r/\lambda \cos (\rho t + \theta)$$

The voltage $e_5$ is applied to a servo system 57 together with the output $$e_6 = E_6 \cos (\rho t + A)$$

from the generator 59. The generator 59 is so coupled to the shaft 7 that $A=0$, if the antenna rotation angle $\rho t$ is measured from the line A—A in Fig. 2. The shaft 61 of the servo system 57 is rotated to an angular position corresponding to the difference in phase between the output of the generator 59 and the output of the detector 55. The angular position of the shaft 61 to which is attached a pointer and 360° scale is $\theta$, the azimuth of wave arrival.

The shaft 51 of the servo device 49 swings continuously with rotation of the collector element. The magnitude of this swing is proportional to $2\pi r/\lambda \cos \psi$, and consequently the output of the detector 55 is also proportional to $\cos \psi$. This fact may be utilized to determine elevation of wave arrival by calibrating the system with a locally generated horizontally incident signal over the range of frequencies through which the direction finder is to be used. The angle $\psi = \cos^{-1} e$ det./$e$ det. max $(4=0)$.

Referring to Fig. 4 the circuit employed in the phase responsive servo systems comprises a variable phase shifter 67 connected to one of the input circuits and in push-pull to the outer control grids of a pair of multi-grid electron discharge tubes 69 and 71. Another input circuit is connected to the inner control grids of the tubes 69 and 71 in parallel. Series resistors 73 are included in the connections to the grids of the tubes 69 and 71. The anodes of the tubes 69 and 71 are connected through load resistors 75 and 77 to a D.-C. source 79. A point of intermediate voltage on the source 79 is connected to the screen grids of the tubes 69 and 71. The load resistors 75 and 77 are shunted by capacitors 81 and 83, respectively.

A reversible D.-C. motor 85 is connected between the anodes of the tubes 69 and 71. The shaft of the motor 85 is connected, as indicated by the dash line 87, to the control shaft of the phase shifter 67. The 360° phase shifter 67 includes capacitors 89 and 91 and resistors 93 and 95 connected in a bridge network, and a voltage divider comprising a resistor 97 connected to the terminals of the bridge. Two variable contacts 99 and 101 are arranged to be moved over the resistor 97 and are mechanically connected together and to the control shaft, as indicated by the dash line 103. The capacitors 89 and 91 and the resistors 93 and 95 are so proportioned as to provide phase shifts of $+90°$ and $-90°$, respectively, at the junction points 105 and 107 between the elements 89, 93 and 91, 95 respectively.

The operation of the above described servo system is as follows:

The two input voltages are of equal frequency. Assume that input No. 1 lags input No. 2 by the angle $\theta$, and that the phase shifter 67 is adjusted to introduce a lead of any magnitude $\beta$. The input to the outer control grids of the tubes 69 and 71 will then differ in phase from the input to the inner control grids of the tubes 69 and 71 by angles of $B-\theta$ and $\theta+\pi-B$, respectively. The control grids are normally biased by means of the common cathode resistor 74 to cut off the plate currents. During the time that both inner and outer control grids are positive, the tubes will conduct. Depending upon which is greater, $B-\theta$ or $\theta+\pi-B$, one of the tubes 69 and 71 will conduct more of the time than the other. The pulsating plate currents are integrated by the capacitors 81 and 83. Thus the average current and hence the voltage drop across one of the resistors 75 and 77 will be greater than the other and the resultant voltage applied to the motor 85 will correspond in magnitude to the difference between $B-\theta$ and $\theta+\pi-B$. The motor 85 runs in one direction or the other to drive the phase shifter 67 to such a position that $B-\theta=\theta+\pi-B$, or $B=\theta+\pi/2$, whereupon the voltages across the load resistors 75 and 77 are equal and the resultant voltage applied to the motor 85 is zero. At this time, the position of the control shaft of the phase shifter 67 corresponds to the angle $\theta+\pi/2$. As shown in Fig. 3 the pointer 63 is set at the angle of $\pi/2$ with respect to the voltage divider, so as to indicate on the scale 65 the difference in phase between the two inputs to the system.

As an alternative to having all of the direction finder equipment located in the housing 11 and rotating with the antenna, the radio frequency amplifier 33 may be used to modulate an ultra high frequency transmitter. A corresponding ultra high frequency receiver 111 may then be provided at a constant distance from the antenna; i. e., at the center of rotation of the system, and the output of this receiver used to operate the equipment described above.

I claim as my invention:

1. In a radio direction finder system providing phase modulation of the carrier of an arriving wave, the method of determining the azimuth of arrival of said wave, comprising the steps of locally generating a modulated voltage having a frequency equal to that of the carrier of said wave, converting said phase modulated signal to an intermediate frequency signal bearing corresponding phase modulation, converting said locally generated voltage to a modulated voltage of intermediate frequency, continuously comparing said intermediate frequency voltage in phase to derive a third voltage having a frequency equal to that of said phase modulation of said signal carrier, locally generating a fourth voltage of constant phase having a frequency equal to said phase modulation of said signal carrier, and comparing the phases of said third and fourth voltages.

2. In a radio direction finder system providing phase modulation of the carrier of an arriving wave, the method of determining the azimuth of arrival of said wave, including the steps of locally generating an unmodulated voltage having a frequency equal to that of said carrier, continuously comparing in phase said locally generated voltage and said carrier voltage to derive a voltage having a frequency equal to that of said phase modulation, locally generating a constant phase voltage of a frequency equal to that of said phase modulation, and comparing in phase said locally generated phase modulation frequency voltage with said derived phase modulation frequency voltage.

3. A radio direction finder system including a revoluble wave collector, means for revolving said collector in a closed path about a predetermined point whereby a signal derived from said collector from an arriving wave is phase modulated by a frequency equal to the frequency of revolution of said collector and in an absolute phase bearing a predetermined relationship to the azimuth of arrival of said wave, means for locally generating an unmodulated voltage equal in frequency to the carrier of said signal, means for comparing the phases of said locally generated voltage and said carrier to control a voltage control device, a source of constant amplitude voltage connected through said voltage regulator to a detector, means for generating a voltage having an instantaneous amplitude which is a predetermined function of the angular position of said wave collector with respect to a reference line, and means responsive to the phases of said voltage and the output of said detector to actuate an azimuth indicator.

4. The invention as set forth in claim 3 including means for separately converting said modulated carrier and said locally generated unmodulated voltage of carrier frequency to voltages of equal low frequency.

5. The invention as set forth in claim 3 including means responsive to the output of said detector to indicate the elevation of arrival of said wave.

LOWELL E. NORTON.